US012578917B2

(12) United States Patent
Liu et al.

(10) Patent No.: US 12,578,917 B2
(45) Date of Patent: Mar. 17, 2026

(54) SPATIAL REDISCOVERY USING ON-DEVICE HARDWARE

(71) Applicant: Google LLC, Mountain View, CA (US)

(72) Inventors: Wei Liang Liu, Taoyuan (TW); Pei-Chen Chuang, Taipei (TW)

(73) Assignee: Google LLC, Mountain View, CA (US)

( * ) Notice: Subject to any disclaimer, the term of this patent is extended or adjusted under 35 U.S.C. 154(b) by 155 days.

(21) Appl. No.: 18/423,090

(22) Filed: Jan. 25, 2024

(65) Prior Publication Data

US 2024/0160399 A1 May 16, 2024

Related U.S. Application Data

(60) Provisional application No. 63/622,433, filed on Jan. 18, 2024.

(51) Int. Cl.
 G06F 3/16 (2006.01)
(52) U.S. Cl.
 CPC .................................... G06F 3/162 (2013.01)
(58) Field of Classification Search
 CPC .......... G06F 3/162; G01S 5/0009; G01S 5/18; G01S 5/28

USPC ...................................................... 381/56, 58
See application file for complete search history.

(56) References Cited

U.S. PATENT DOCUMENTS

| | | | |
|---|---|---|---|
| 2020/0005830 A1 | 1/2020 | Wasada et al. | |
| 2022/0038819 A1* | 2/2022 | Dusan ................ | H04M 1/6008 |
| 2022/0122446 A1 | 4/2022 | Thaker et al. | |
| 2022/0206739 A1 | 6/2022 | Tan et al. | |

\* cited by examiner

*Primary Examiner* — George C Monikang
(74) *Attorney, Agent, or Firm* — Colby Nipper PLLC

(57) ABSTRACT

This document describes systems and techniques for facilitating spatial rediscovery using on-device hardware. For example, an audio input mechanism associated with a compact device can be activated and an audio signal can be generated by an audio output mechanism associated with an external device. The audio signal can be received at the audio input mechanism associated with the compact device. The receipt of the audio signal may cause the audio input mechanism to produce electrical signals having encoded information associated with the audio signal. The electrical signals can then be transmitted to the external device as wireless signals. Based on an analysis of the transmitted wireless signals, a spatial positioning of the compact device relative to the external device can be determined. Based on the determination of the spatial positioning, a location indicator can be provided via the external device.

20 Claims, 8 Drawing Sheets

100

Compact Device
104

Audio Input Mechanism(s)
116

Processing and Communications System
114

Received Audio Signal
120

Enable Signal
112

110

118

Wireless Signals
122

Audio Output Mechanism(s)
106

Processing and Communications System
108

Location Indicator
124

External Device
102

FIG. 3A            FIG. 3B

1000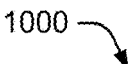

Activating an audio input mechanism associated with a compact device
1002

Generating an audio signal by an output audio mechanism associated with an
external device
1004

Receiving the audio signal at the audio input mechanism associated with the compact
device, the receiving of the audio signal causing the audio input mechanism to produce
electrical signals having encoded information associated with the audio signal
1006

Transmitting the electrical signals to the external device
1008

Determining, based on an analysis of the transmitted electrical signals, a spatial
positioning of the compact device relative to the external device
1010

Providing, based on the determination of the spatial positioning, a location indicator via
the external device, the location indicator including information related to the spatial
positioning of the compact device relative to the external device
1012

FIG. 10

SPATIAL REDISCOVERY USING ON-DEVICE HARDWARE

CROSS-REFERENCE TO RELATED APPLICATION

This application claims the benefit of U.S. Provisional Patent Application Ser. No. 63/622,433, filed on Jan. 18, 2024, the disclosure of which is incorporated by reference herein in its entirety.

SUMMARY

This document describes systems and techniques for facilitating spatial rediscovery using on-device hardware. In aspects, the systems and techniques described herein provide tools for assisting users in locating compact devices without requiring additional hardware, such as an audio output mechanism, integrated within compact devices. For example, an audio input mechanism associated with a compact device can be activated and an audio signal can be generated by an audio output mechanism associated with an external device. The audio signal can be received at the audio input mechanism associated with the compact device. The receipt of the audio signal may cause the audio input mechanism to produce electrical signals having encoded information associated with the audio signal. The electrical signals can then be transmitted to the external device as wireless signals. Based on an analysis of the transmitted wireless signals, a spatial positioning of the compact device can be determined relative to the external device. Based on the determination of the spatial positioning, a location indicator may be provided via the external device. The location indicator may include information related to the spatial positioning of the compact device relative to the external device.

This Summary is provided to introduce systems and techniques for facilitating spatial rediscovery using on-device hardware, as further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of systems and techniques for facilitating spatial rediscovery using on-device hardware are described in this document with reference to the following drawings. The same numbers are used throughout the drawings to reference like features and components:

FIGS. 3A-3C are schematic diagrams of an external device generating an audio signal detectable by the compact device

FIG. 10 is a flow diagram of an example method of facilitating spatial rediscovery using on-device hardware.

DETAILED DESCRIPTION

Overview

Compact devices, including remote controls, earbuds, smartwatches, or other such devices, can be easily misplaced. For instance, compact devices may fall between furniture cushions, roll under furniture, or may be covered by other objects. In other instances, compact devices may simply be overlooked by a user.

Some devices include audio output mechanisms that may produce noise when activated by a wirelessly-connected device to assist users in locating the devices. For example, an earbud may include an audio output mechanism (or a case for storing and/or charging the earbud may include an audio output mechanism) that generates sounds when triggered by a smartphone paired with the earbud. A user can then follow the sounds generated by the earbud to assist in rediscovery. However, the sound generated may not be loud enough for a user to detect, either because the missing device is too far away or is covered by another object thereby muffling the sound generated. Also, for example, if the audio output mechanism is situated in the case, but it is the earbud alone that is missing, the audio output mechanism in the case will not help the user find the missing earbud. Whether or not the audio output mechanism aids a user in finding a missing device, including an audio output mechanism in some devices may require additional hardware, resulting in added costs and design complexity. Further, this additional hardware may consume physical space in these constrained devices and expend electrical power.

To this end, this document describes systems and techniques for facilitating spatial rediscovery using on-device hardware. For example, an audio input mechanism associated with a compact device can be activated and an audio signal can be generated by an audio output mechanism associated with an external device. The audio signal can be received at the audio input mechanism associated with the compact device. The receipt of the audio signal may cause the audio input mechanism to produce electrical signals having encoded information associated with the audio signal. The electrical signals can then be transmitted to the external device as wireless signals. Based on an analysis of the transmitted wireless signals, a spatial positioning of the compact device relative to the external device can be determined. Based on the determination of the spatial positioning, a location indicator can be provided via the external device. The location indicator may include information related to the spatial positioning of the compact device relative to the external device.

Figure 1:
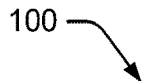
FIG. 1 is a block diagram of a system for facilitating spatial rediscovery using on-device hardware.

Example System for Locating a Compact Device without an Audio Output Mechanism FIG. 1 illustrates a system 100 including an external device 102 that communicates (e.g., wirelessly) with a compact device 104 to assist a user (not illustrated) in rediscovering (e.g., spatially locating) the compact device 104. In at least some implementations, the compact device 104 may not include an audio output mechanism (e.g., a speaker). The external device 102 includes one or more audio output mechanisms 106 operably coupled with a processing and communications system 108. When spatially rediscovery of the compact device 104 is initiated, the processing and communications system 108 of the external device 102 uses a wireless communications link 110 to send an enable signal 112 to cause a processing and communications system 114 of the compact device 104 to activate one or more audio input mechanisms 116 of the compact device 104.

The audio input mechanism 116 may include a microphone and/or similar device. In implementations, the audio input mechanism 116 may be incorporated within the compact device 104. For example, if the compact device 104 is a remote control for a television, the audio input mechanism 116 may include a microphone included in the remote control that a user may employ to search for desired video content or issue other commands to the television. In another example, if the compact device 104 is an earbud, the audio input mechanism 116 may include a microphone included in the earbud to enable a user to speak during telephone calls. In these examples, the audio input mechanism 116 is a pre-existing hardware component included in the compact device 104 to perform some other function unrelated to locating the compact device 104. Thus, no additional hardware component has to be added to or incorporated in the design of the compact device 104 to provide audio input capability to enable location operations.

Once the processing and communications system 108 of the external device 102 sends the enable signal 112 to the processing and communications system 114 of the compact device 104, effective to activate the audio input mechanism 116, the processing and communications system 108 generates an audio signal 118 (e.g., mechanical pressure waves) via the audio output mechanism 106. The audio signal 118 may be detectable by the enabled audio input mechanism 116 of the compact device 104 when the compact device 104 is within an operating audio range of the external device 102. The audio input mechanism 116 may then receive the audio signal 118 (or a version thereof) and generate corresponding electrical signals. These electrical signals may include encoded information associated with the received audio signal 118. The audio signal 118 may be within a frequency range of human hearing or may include an ultrasonic signal, e.g., at a frequency above the frequency range of human hearing. The audio signal 118 may be within any frequency range that is both producible by the audio output mechanism 106 and detectable by the audio input mechanism 116.

The processing and communications system 114 may, optionally, process, manipulate, or otherwise alter the electrical signals. The processing and communications system 114 can then transmit wireless signals 122 representative of the received audio signal 120 via the wireless communications link 110 to the external device 102. The wireless signals 122 may include at least a portion of the audio signal 118 received by the audio input mechanism 116 from the external device 102. The processing and communications system 108 of the external device 102 can then process the transmitted wireless signals 122 to determine a spatial positioning of the compact device 104 (e.g., relative to the external device 102). As described further below, the processing and communications system 108 may determine, (i)

from a capture time at which the received audio signal 120 was received and recorded at the compact device 104 and (ii) by comparing it to a transmit time when the audio signal 118 was generated, a relative distance of the compact device 104 from the external device 102. Also, the processing and communications system 108 may analyze an amplitude level of the received audio signal 120 (e.g., by analysis of the wireless signals 122) to determine a distance between the compact device 104 and the external device 102. As described below, implementations may also involve an analysis of the received audio signal 120 to determine a relative direction from the external device 102 at which the compact device 104 is positioned.

After analyzing the received audio signal 120 (e.g., as digitally represented in the wireless signals 122), the external device 102 can generate a location indicator 124 that a user may utilize to assist in rediscovering the compact device 104. The location indicator 124 may be a visual indicator, an audible indicator, and/or an audiovisual indicator, as described further below. Again, it should be noted that the location indicator 124 is generated by the external device 102 and does not depend on an audio signal being generated by an audio output mechanism in the compact device 104.

Figure 2:
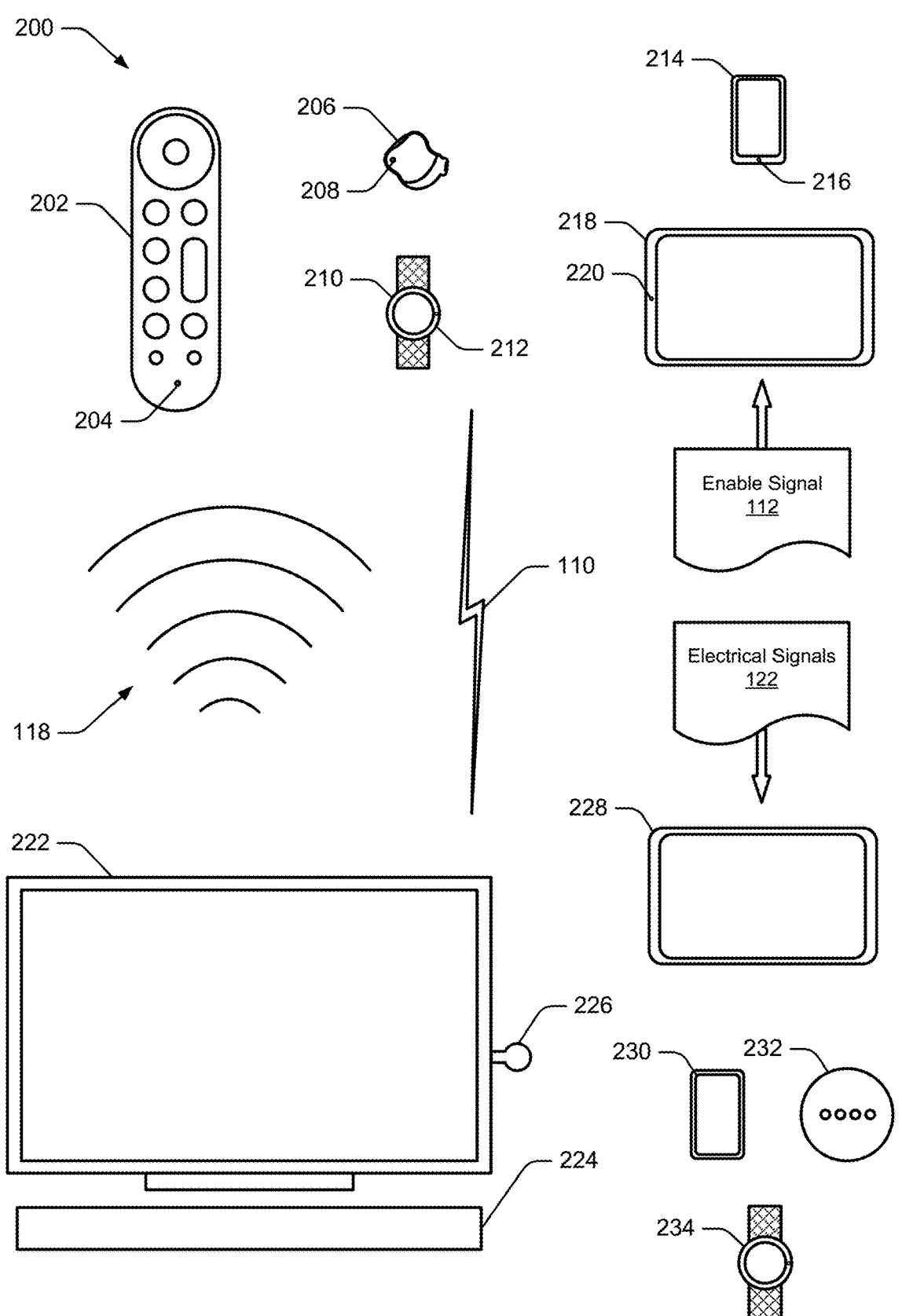
FIG. 2 is a schematic diagram of compact devices that may be located by one or more types of external devices.

Referring to FIG. 2, the compact device 104 (see FIG. 1) may include any number of devices. For example, the compact device 104 may include a remote control 202 that controls a television or other media device. As previously described, the remote control 202 may include an audio input mechanism 204 that allows the remote control 202 to receive and respond to voice commands from a user. The compact device 104 may include a hearable device, such as one or more earbuds 206 that interoperate with a smartphone, computer, television, or other media device. The earbud 206 may include a microphone 208 to enable voice communications or to receive voice commands. The compact device 104 also may include a wearable device, such as a smartwatch 210 which may include a microphone 212 to receive and respond to voice commands from a user. The compact device 104 also may include handheld computing devices such as a smartphone 214 with an integrated microphone 216 or a tablet computer 218 with an integrated microphone 220. The compact devices 202, 206, 210, 214, and 218 are configured to use the wireless communications link 110, such as a Bluetooth or Wi-Fi communications link, to communicate with an external device 102 (see FIG. 1).

The external device 102 (FIG. 2) also may include any number of devices that are associated with an audio output mechanism 106 (see FIG. 1) that enable the external device 102 to generate the audio signal 118 that may be used to locate the compact devices 202, 206, and 210. For example, a television 222, may generate the audio signal 118 via one or more built-in speakers (not shown) included within the television 222 or an external audio system, such as a soundbar 224 associated with the television 222 via wired or wireless communications. The television 222 may include a dongle 226 that provides access to streaming or other entertainment services. The television 222 may communicate with the remote control 202 directly or via the dongle 226. The television 222 is configured to use the wireless communications link 110 with other devices, either directly or via the dongle 226. The external device 102 also may include a tablet computer 228, a smartphone 230, a smart speaker 232, or a smartwatch 234, each of which is equipped with one or more built-in audio output mechanisms (not shown) and is configured to use the wireless communications link 110 with other devices.

It should be noted that a compact device 104, such as a smartwatch 234, for example, could serve as an external device 102 to find another of the compact devices 104, such as the earbud 206. In implementations, any device that has the capability to generate the audio signal 118 and to receive and process the received audio signal 120 (see FIG. 1) may be used to locate another device.

As described with reference to FIG. 1, using the audio output mechanism 106 included in one or more of the external devices 222, 224, 226, 228, 230, 232, or 234, the audio signal 118 configured to be detected by the audio input mechanism 116 of one of the compact devices 202, 206, 210, 214, or 218. Once one of the external devices 222, 224, 226, 228, 230, 232, or 234 issues the enable signal 112 to enable the audio input mechanism 116 (such as one of the microphones 204, 208, 212, 216, or 220) of one of the compact devices 202, 206, 210, 214, or 218, the respective compact device 202, 206, 210, 214, or 218 records at least a component of the audio signal 118 and transmits the wireless signals 122 via the wireless communications link 110 for analysis by one or the external devices 222, 224, 226, 228, 230, 232, or 234. The external device 222, 224, 226, 228, 230, 232, or 234 then provides a visual, audible, or audio-visual location indicator 124 (see FIG. 1), as further described below, to assist a user in locating the compact device 202, 206, 210, 214, or 218.

Example of Using a Portable Device to Locate a Compact Device

Figure 3C:
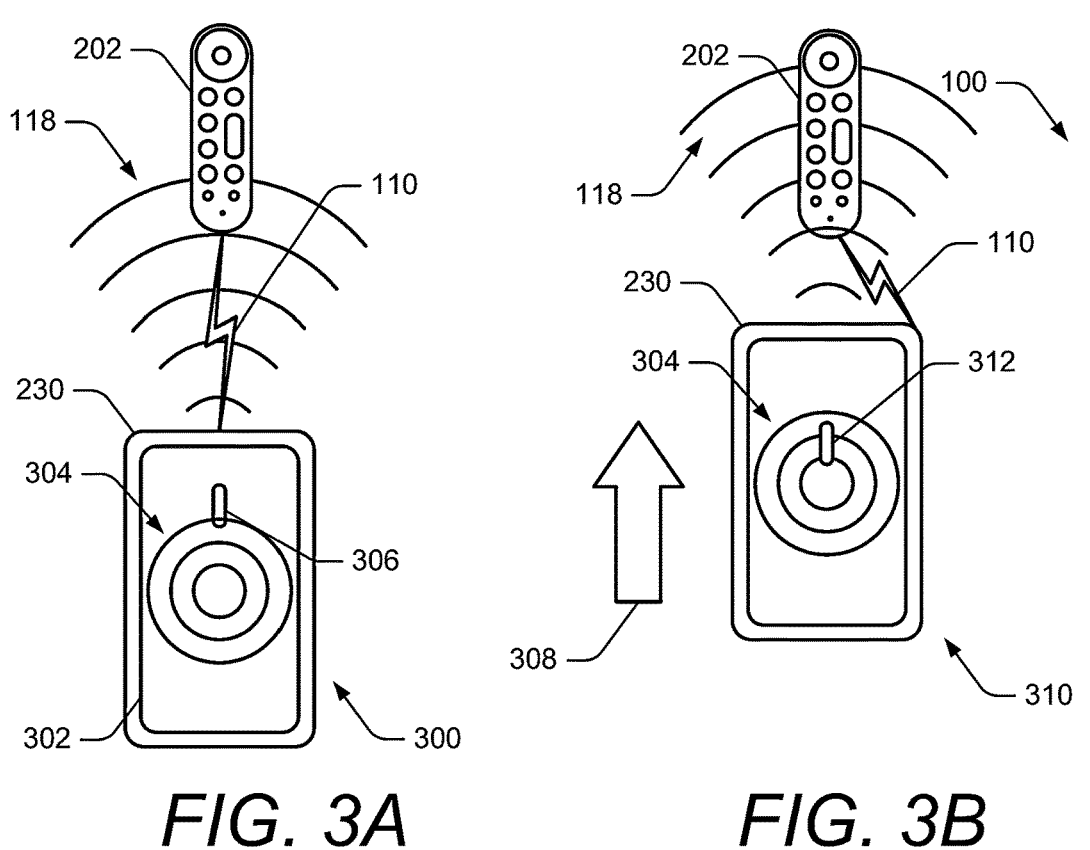
Figure 3C:
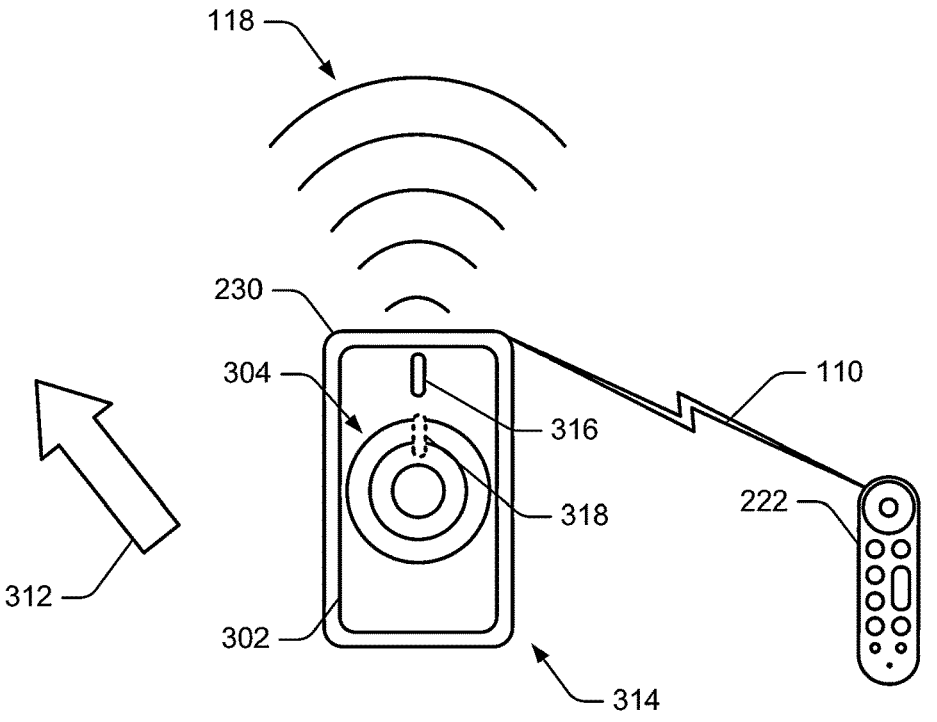

FIGS. 3A and 3B illustrate an example of a user using the smartphone 230 to locate a compact device such as the remote control 202. Although the example of FIGS. 3A and 3B describes the use of the smartphone 230 to find the remote control 202, it should be appreciated that another portable device, such as the tablet computer 228, also could be used to find the remote control 202. The smartphone 230, the tablet computer 228, the smartwatch 234, or another portable device also could be used to find the earbud 206 or the smartwatch 210 as described with reference to FIGS. 3A and 3B.

In FIG. 3A, the smartphone 230 is situated at a first location 300 when a spatial discovery function is initiated by a touch-input or voice command. The spatial rediscovery function may activate the audio input mechanism 204 on the remote control 202 (see FIG. 2) and the audio output mechanism 106 (see FIG. 2) on the smartphone 230. The audio output mechanism 106 may generate the audio signal 118 for receipt by the remote control 202. As illustrated, a display 302 of the smartphone 230 includes a visual location indicator 304 in which a symbol 306 represents a spatial positioning of the remote control 202. The symbol 306 is positioned relative to the visual location indicator 304 to indicate a spatial positioning in the form of a relative distance of the position of the remote control 202 from the first location 300 of the smartphone 230. In this example, the smartphone 230 is able to determine a relative distance of the smartphone 230 to the remote control 202 but does not provide directional guidance. As a user moves the smartphone 230, the smartphone 230 is able to inform a user whether the smartphone is getting closer to or farther away from the remote control 202 to help the user find the remote control.

Figure 4A:
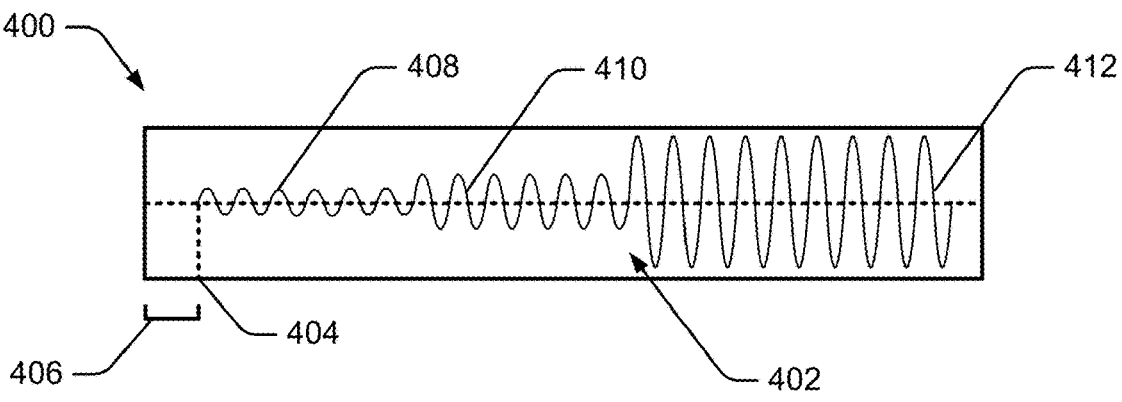
FIGS. 4A-4C are signal graphs of an audio signal generated and received audio signals in the example of FIGS. 3A and 3B.

As described with reference to FIGS. 4A-4C, in implementations, the smartphone 230 is able to determine a spatial positioning of the remote control by analyzing the wireless signals 122 representative of the received audio signal 120

(see FIGS. 1 and 2) transmitted via the wireless communications link 110. FIG. 4A shows a signal graph of an audio signal 402 that may be used as the audio signal 118 (FIGS. 1-3C). The audio signal 402 may be a constant frequency and may be generated at a transmit time 404 after a delay 406 following initiation of the rediscovery operation by initiating a command on the smartphone 230.

In implementations, an interval between when the audio signal 402 is generated and when it is detected by the remote control 202 (or other compact device) is used to determine a spatial positioning of the remote control 202. To prevent the distance to the remote control 202 from being overestimated as a result of the delay in first generating the audio signal 402, the smartphone 230 or other external device 102 may be calibrated by placing the remote control 202 or another compact device 104 adjacent to the external device 102 (see FIG. 1). With the remote control 202 adjacent to the smartphone 230 or other external device 102, a delay between the rediscovery operation being initiated and the signal being detected results from a delay in generating the audio signal 118 rather than a time required for the audio signal 118 to propagate to the remote control 202. The delay 406 detected in such a calibration operation may be deducted from the difference in time between when the rediscovery operation is initiated and the audio signal 118 is detected by the remote control 202. Deducting the delay 406 may prevent the distance to the remote control 202 from being overestimated as a result in the delay 406 in the audio signal 118 being generated.

In implementations, an amplitude level of the audio signal 402 may be increased over time to help ensure that the remote control 202 is able to detect the audio signal 118. For example, the audio signal 402 is initially generated at a first amplitude level 408, then is increased to a second amplitude 410 level and a third amplitude level 412. For the sake of user experience, it may not be desirable to generate the audio signal 402 at an amplitude level or volume level greater than necessary to facilitate finding the remote control 202 or another compact device 104. However, if the remote control 202 is too far away from the smartphone 230 to detect the audio signal 402 at the first amplitude level 408 or if the remote control 202 is covered by one or more objects that at least partially block the audio signal 402 from reaching the remote control 202, by increasing the audio signal 402 to the second amplitude level 410 or the third amplitude level 412 may render the audio signal 402 loud enough to be detected by the remote control 202.

Figure 4B:
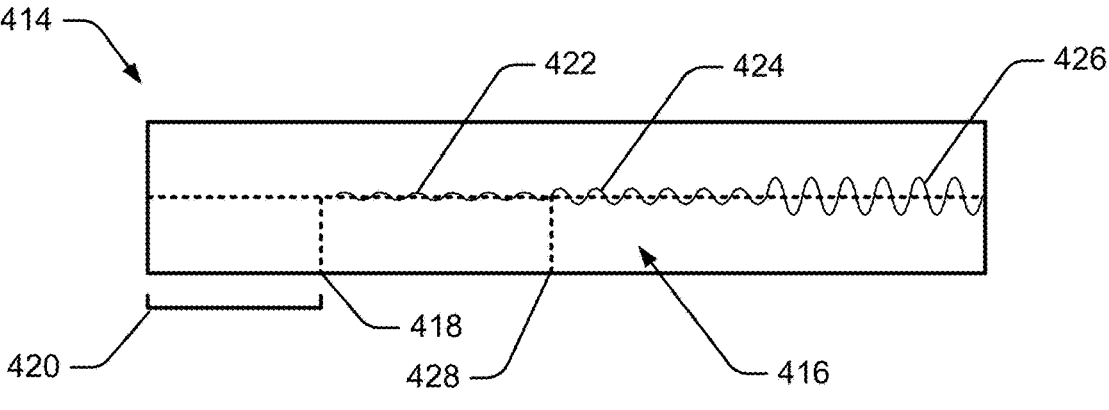
Figure 4C:
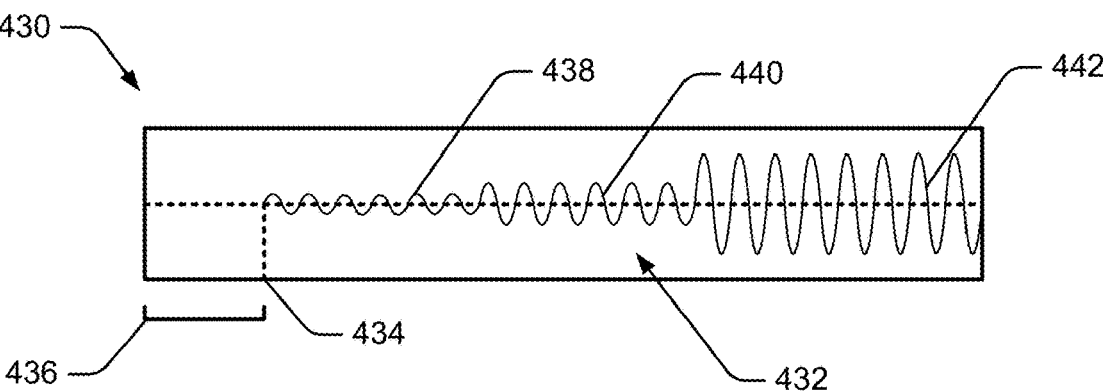

FIG. 4B shows a signal graph 414 of a received audio signal 416 that may be detected and recorded by the remote control. The received audio signal 416 is first detected at a capture time 418 after a delay 420. The delay 420 represents an interval required for the audio signal 402 generated by the smartphone 230 to reach the remote control 202. As previously described, part of the delay 420 may be attributable to the delay 406 in generating the audio signal 402 and the smartphone 230 may deduct the delay 406 in generating the audio signal 402 in determining a relative distance between the smartphone 230 and the remote control 202. The received audio signal 416 is received at a first received amplitude level 422, a second received amplitude level 424, and a third received amplitude level 426 which are all less than the first amplitude level 408, the second amplitude level 410, and the third amplitude level 412 of the audio signal 402 generated by the smartphone 230. As previously described, the reduced amplitude levels of the received audio signal 416 may be a result of distance between the smartphone 230 and the remote control 202 and/or as a result of obstructions between the smartphone 230 and the remote control 202 that partially block the audio signal 402 from reaching the remote control 202.

It is possible, for example, that the received audio signal 402 at the first received amplitude level 422 is not detectable by the remote control 202 via the audio input mechanism 204 but may detect the received audio signal 416 at a capture time 428 when the received audio signal 416 reaches the second received amplitude level 424 resulting from the increased second amplitude level 410 of the audio signal 402 generated by the smartphone 230. Thus, increasing the amplitude level of the audio signal 402 generated may help to locate the remote control 202 even if the audio signal 402 generated at the first amplitude level 408 is not detectable by the audio input mechanism 204 of the remote control 202. The increased interval between the capture time 428 at which the audio signal 416 is detected may falsely indicate that the remote control 202 is located at a position farther from the smartphone than it actually is but, as described below, moving the smartphone 230 to determine whether the smartphone 230 is getting closer to or further away from the remote control 202 will nonetheless aid in locating the remote control 202. Successively comparing data, such as the capture time 428 with the transmit time 404 and/or the received amplitude level 424 with the amplitude level 408, 410, and/or 412 as the smartphone 230 is moved enables the smartphone 230 to aid the user in finding the remote control 202.

Referring back to FIG. 3B, the user may move the smartphone 230 in a direction 308 to a second location 310 that, as depicted in FIG. 3B, is proximally nearer to the remote control 202, resulting in the location indicator 304 presented on the display 302 of the smartphone 230 showing an updated symbol 312 representing that the spatial positioning of the remote control 202 is at a location closer to the smartphone 230. Referring now to FIG. 4C, when the smartphone 230 is moved closer to the remote control, a signal graph 430 shows a received audio signal 432 received at a capture time 434 after an interval 436 that is less than the delay 420 (see FIG. 4B) at which the received audio signal 416 was detected before the smartphone 230 was moved closer to the remote control 202. An increased first received amplitude level 438, an increased second received amplitude level 440, and an increased third received amplitude level 440 as compared to the respective first received amplitude level 422, second received amplitude level 424, and third received amplitude level 426 of the received audio signal 416 also indicate that the smartphone 230 is proximally nearer to the remote control 202. Implementations may use a difference in the delay 420 and/or the changes between amplitudes relative to the received amplitude levels 422, 424, and 426 to determine changes in the relative distance to the remote control 202 and to update the visual location indicator 304 to guide a user to the remote control 202.

Referring back to FIG. 3C, it is possible that the user may believe that they are moving toward the remote control 202 but may continue moving and end up further away from the remote control 202. For example, the user may move the smartphone 230 in a direction 308 to a third location 314 that is further away from the remote control 202 than was the first location 300 (see FIG. 3A) or the second location 310 (see FIG. 3B). When the smartphone 230 is moved further away from the remote control 202, a delay between a capture time when a received audio signal is received and a transmit time when the audio signal was generated may increase and the amplitude level of the received audio signal may decrease as compared to a previously-received audio signal. In other words, moving the smartphone 230 away from the remote control 202 results in the received audio signal being more like the received audio signal 416 of FIG. 4B than the received audio signal 432 of FIG. 4C. As a result, the location indicator 304 on the display 302 of the smartphone 230 is updated to show a symbol 316 representing the remote control 202 as now being farther away from the smartphone 230.

In implementations, the location indicator 304 may include an historical symbol 318 (represented in dotted lines in FIG. 3C) to visually indicate to the user that the user has moved the smartphone 230 further from the external device 102. Thus, by moving the smartphone 230, a user may determine whether they are moving closer to or further away from the remote control 202 until the user locates the misplaced remote control 202.

Example of Using a Multiple Audio Signals to Locate a Compact Device

Instead of generating a signal audio signal as described with reference to FIGS. 3A through 4C, an external device 102 may generate multiple audio signals from multiple audio output mechanisms in order to triangulate or otherwise determine a distance and direction to a compact device 104 (see FIG. 1). The received audio signal 120 may include components from each of the multiple generated audio signals, thus, analyzing the different components of the electrical signals representing the received audio signal may indicate different distances between each of the multiple audio output mechanisms and the compact device 104. The different distances may be determined by different delays between when each of the components of each of the multiple audio signals is received and/or a difference in amplitude level between the components of the multiple audio signals, the process for each component being analogous to the process applied for analyzing a received audio signal reflecting a single audio signal generated from a single audio output.

Figure 5:
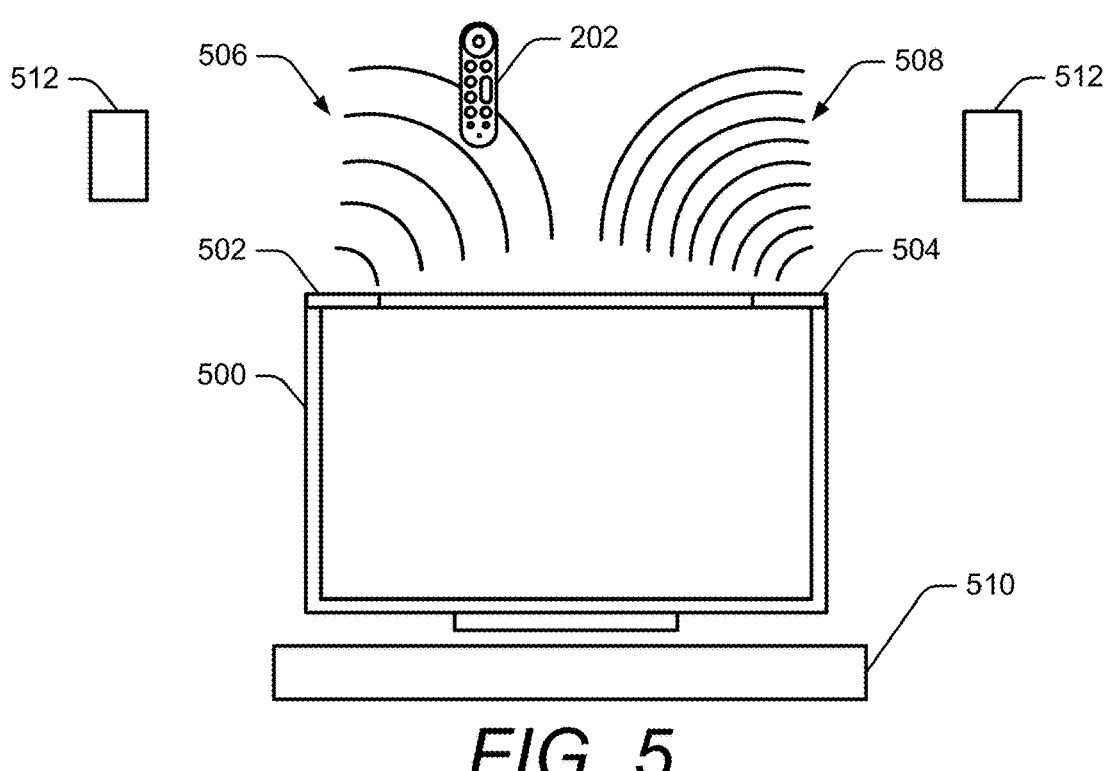
FIG. 5 is a schematic diagram of a television configured to generate audio signals detectable by a remote control.

Referring to FIG. 5, a television 500 includes a first audio output mechanism 502 and a second audio output mechanism 504. In implementations, the audio output mechanisms 502 and 504 each generate audio signals 506 and 508, respectively, having a different characteristic, such as being of different frequencies or having different waveforms such that the audio signals 506 and 508 may be differentiated from one another in a received audio signal. It should be noted for purposes of this example that the remote control 202 is closer to the first audio output mechanism 502, which will be reflected in a received audio signal captured by the remote control 202. The television 500 may be coupled via wired or wireless communications with separate or additional audio output mechanisms, such as a soundbar 510 and/or one or more other speakers 512, such as may be used in a home theater or surround sound system. The separate or additional audio output mechanisms 510 and 512 may be used to generate audio signals (not shown) analogous to the audio signals 506 and 508 generated by the first audio output mechanism 502 and the second audio output mechanism 504 that may be captured by an audio input mechanism on the remote control 202 or other compact device to be located. A distance between the audio output mechanisms 502, 504, 510, and/or 512 may be used in helping to determine a spatial positioning of the remote control 202 relative to the audio output mechanisms 502, 504, 510, and/or 512.

Figure 6A:
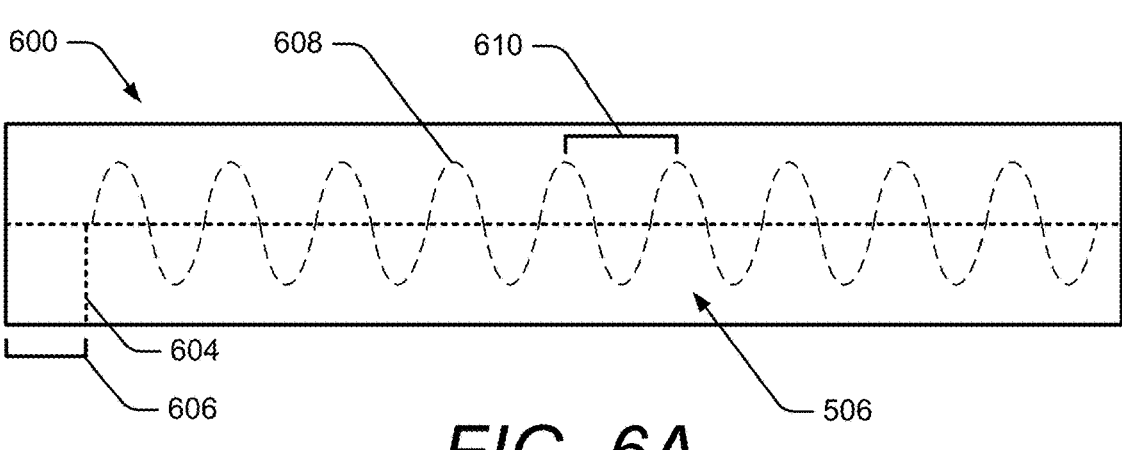
FIGS. 6A and 6B are signal graphs of the audio signals generated by the television of FIG. 5.
Figure 6B:
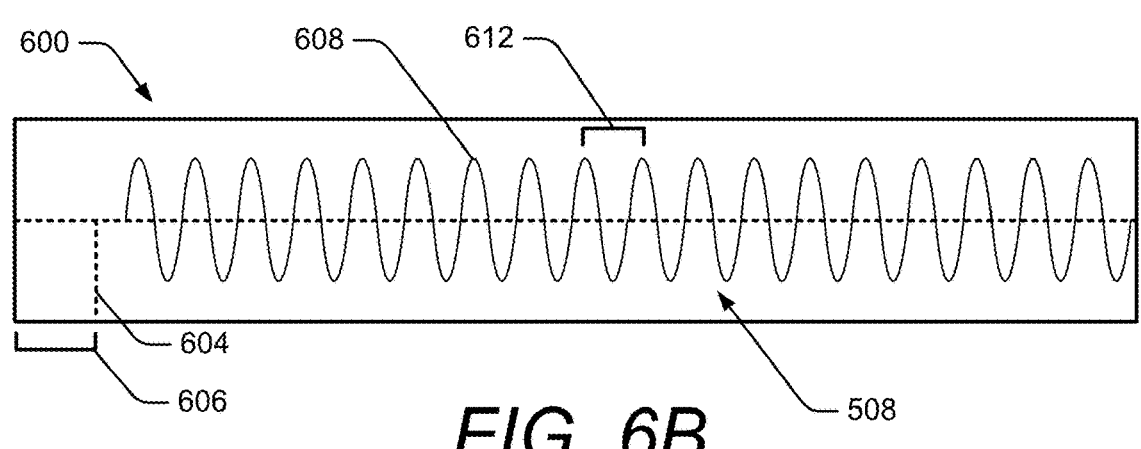

FIG. 6A illustrates a first signal graph 600 shows a first audio signal 506 generated by the first audio output mechanism 502 while FIG. 6B illustrates a second signal graph 602 showing a second audio signal 508 generated by the second audio output mechanism 504 of the television 500. Because both the first audio output mechanism 502 and the second audio output mechanism 504 are controlled by the television 500, the first audio signal 506 and the second audio signal 508 are generated at a same time 604 after a same initiation delay 606. However, it should be noted that, if the first audio signal 506 and the second audio signal 508 are not generated at the same time 604 that any offset between generation of the audio signals 506 and 508 may be accounted for in analyzing a received audio signal, analogous to the process of accounting for an initiation delay as previously described with reference to FIG. 4A.

In the example of FIGS. 6A and 6B, the audio signals 506 and 508 are each generated at approximately the same, constant amplitude level 608, although the amplitude levels of the audio signals 506 and 508 could be different as long as the amplitude level differences are accounted for in analyzing a received audio signal. Also, the amplitude levels of the audio signals 506 and 508 could be increased over time as described with reference to the example of FIGS. 3A-3C. However, one distinction to note is that the first audio signal 506 and the second audio signal 508 have at least one different characteristic: the first audio signal 506 is generated at a first frequency 610 that is different from that of a second frequency 612 of the second audio signal 508. (In the example of FIGS. 6A and 6B, the first frequency 610 is approximately half that of the second frequency 612, but this ratio between the first frequency 610 and the second frequency 612 is chosen merely for illustration and it will be appreciated that there is no requirement that one of the frequencies be a multiple of the other.) The audio signals 506 and 508 being generated at different frequencies 610 and 612 enables components of the audio signals 506 and 508 to be differentiated in the received audio signal to determine a relative proximity of the remote control 202 to the audio output mechanisms 502 and 504 to aid in determining a direction at which the remote control 202 is situated. Although in this example, the differentiating characteristic between the audio signals 506 and 508 is a different frequency, another differentiating characteristic could be used, such as a different waveform pattern.

Figure 7:
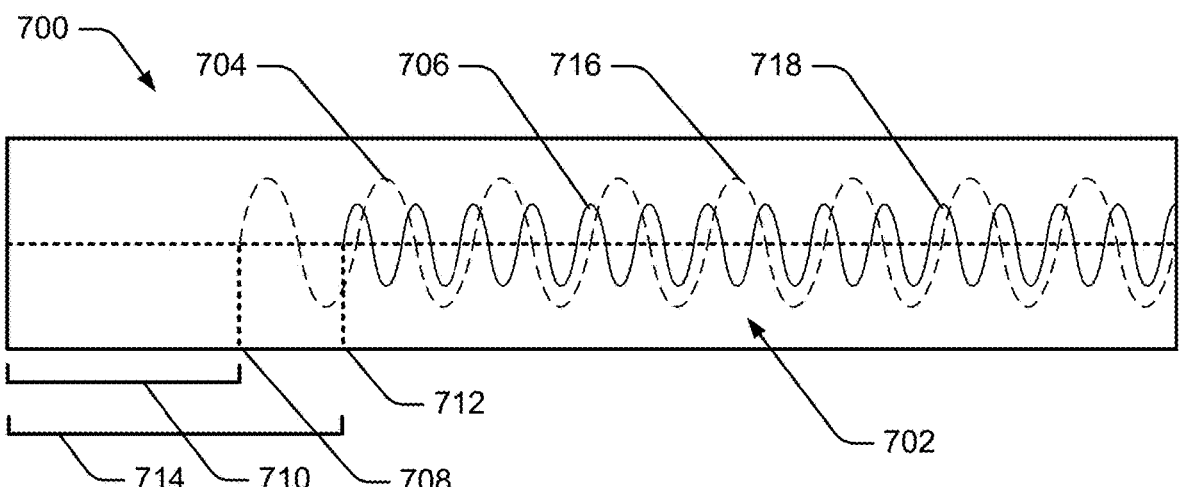
FIG. 7 is a signal graph of a received audio signal detected by the remote control of FIG. 5 including components of the signals of FIGS. 6A and 6B.

Referring to FIG. 7, a signal graph 700 of a received audio signal 702 captured and transmitted by the remote control 202 via the wireless communications link 110 (see FIGS. 1, 2, and 3A-3C). The received audio signal can be differentiated into a first component 704 and a second component 706 representing the audio signals 506 and 508, respectively based on the characteristics of the audio signals 506 and 508. Because the first audio signal 506 is generated at the first frequency 610, the first component 704 can be differentiated from the second component 706 and associated with the first audio output mechanism 502. Similarly, because the second audio signal 508 is generated at the second frequency 612, the second component 706 can be differentiated from the first component 704 and associated with the second audio output mechanism 504.

The first component 704 is detected at a capture time 708 after a delay of 710 and the second component is detected at a capture time 712 after a delay of 714 (of which the delay 710 and 714 may or may not be adjusted for an initiation delay in the audio signal 506). A first amplitude level 716 of the first component 704 is larger than that of a second amplitude level 718 of the second component 706. Based on the difference in the delays 710 and 714 and/or the difference in the amplitude levels 716 and 718, a spatial positioning of the remote control 202 may be determined. For example, part of the determination may be based on comparing the delays 710 and 714 and the amplitude levels 716 and 718 to determine whether the remote control 202 is closer to the first audio output mechanism 502 or the second audio output mechanism 504. Moreover, based on the delays 710 and 714 and the amplitude levels 716 and 718, a position of the remote control 202 may be estimated based on triangulating a distance to the remote control 202 that may be derived from the components 704 and 706 of the received signal 702.

Figure 8:
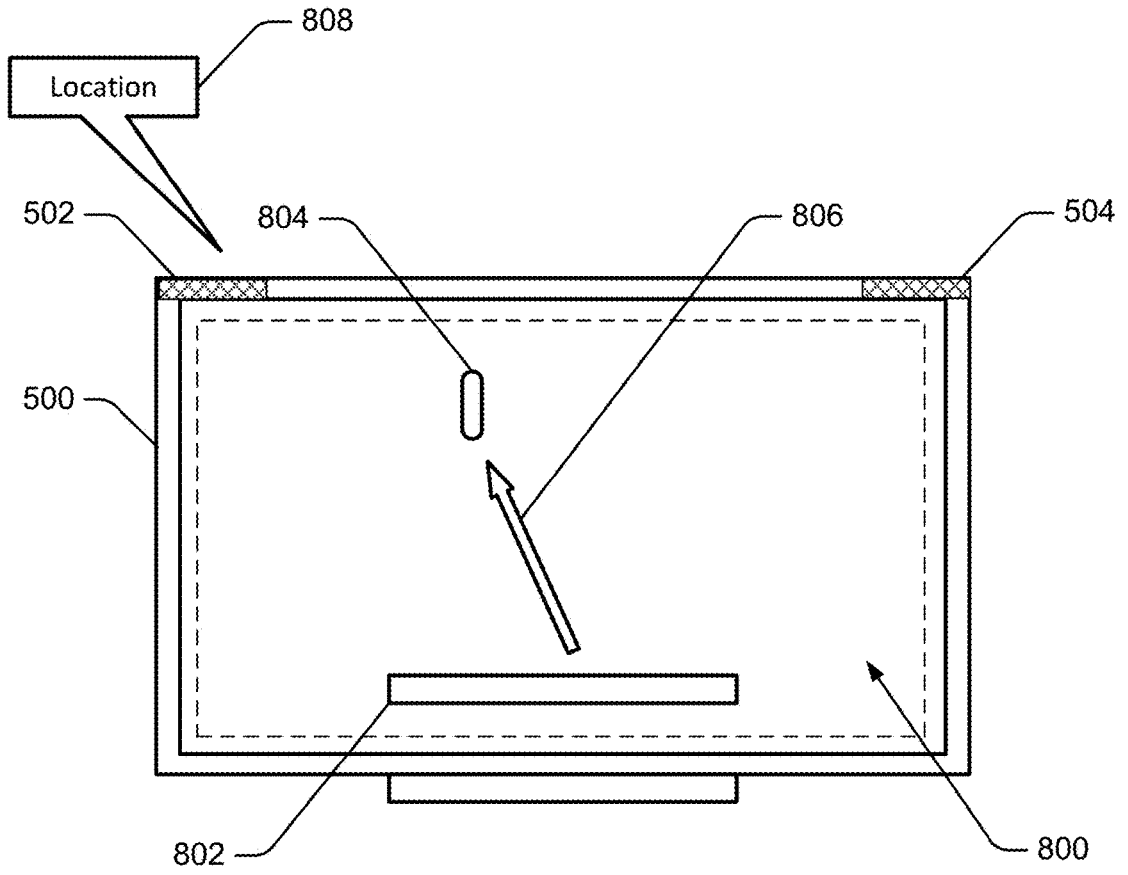
FIG. 8 is a schematic diagram of the television of FIG. 5 providing a location indicator for the remote control based on the received audio signal of FIG. 7.

Referring to FIG. 8, a visual indicator 800 may be presented on the television 500 to indicate a spatial positioning of the remote control 202 relative to the television 500. In implementations, the visual indicator 800 may include a representation 802 of the television 500 and a representation 804 of the remote control 202. Implementations also may include a vector 806 identifying a direction and relative distance to the remote control 202 from the television 500. Moving in the direction indicated by the visual indicator 800 and/or the vector 806, a user may locate the remote control 202. Implementations also may include an audible indicator 808 providing information as to the relative direction of the remote control 202 from the television 500, for example, reporting that "the remote control is located toward the left side of the television at a distance of X feet."

Figure 9:
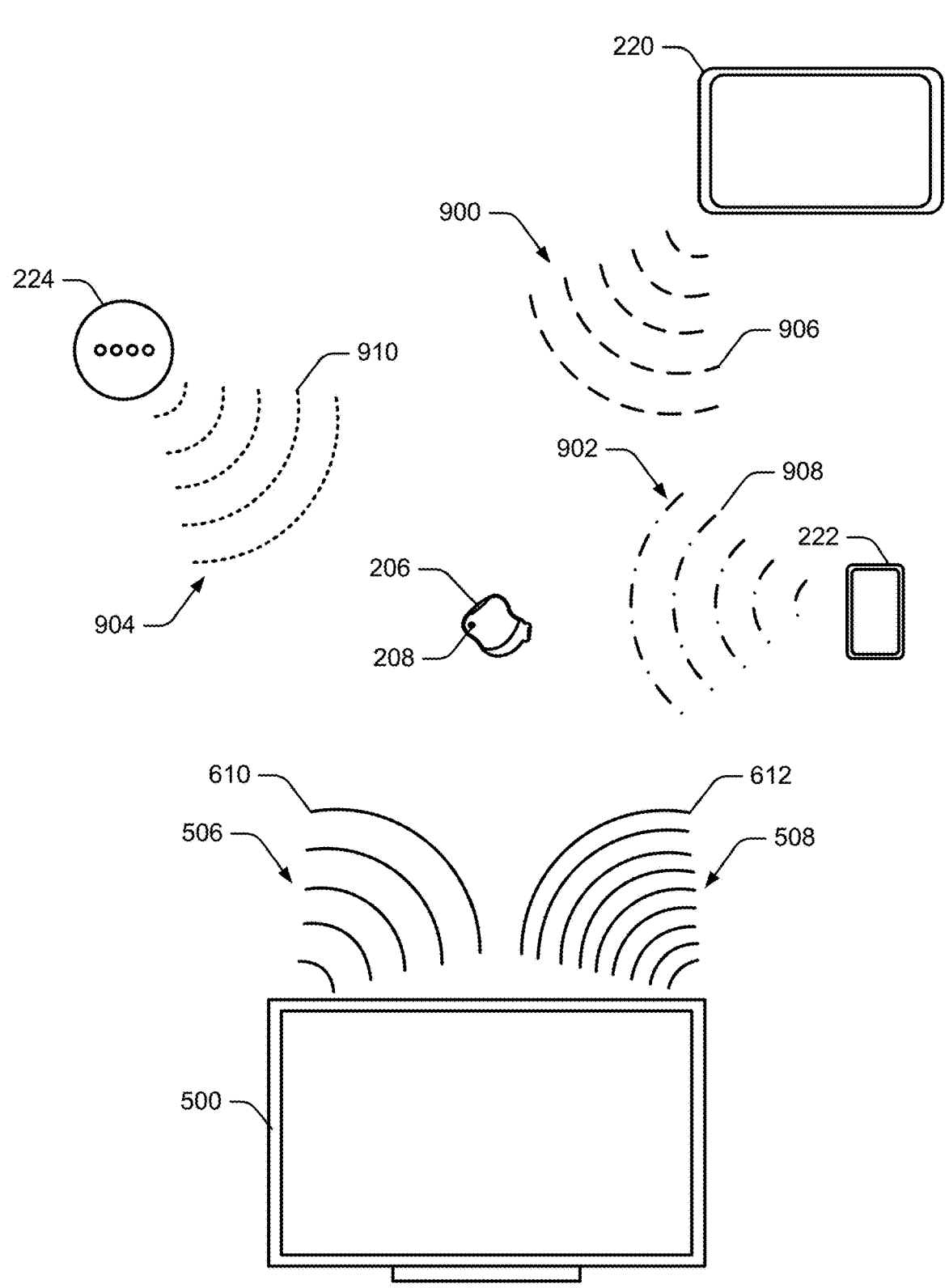
FIG. 9 is a schematic diagram of multiple different external devices generating audio signals to detect a compact device.

Referring to FIG. 9, in other implementations, a compact device may be located based on different audio signals being generated by different external devices. Taking the example of the earbud 206 (see FIG. 2) with a microphone 208, two or more of the television 500, the tablet computer 220 (or other computer), the smartphone 230, or the smart speaker 224 may be triggered to generate (e.g., cooperatively) audio signals to locate the earbud 206. The television 500 may generate audio signals 506 and 508 (as previously described with reference to FIG. 5) while the tablet computer 220 generates an audio signal 900, the smartphone 230 generates an audio signal 902, and a smart speaker 224 generates an audio signal 904.

The audio signals 506 and 508 generated by the television 500 may be at different frequencies 610 and 612, as previously described, and the audio signals 900, 902, and 904 also may be generated at different frequencies or other different characteristics so that analysis of a received audio signal (not shown in FIG. 9) may enable differentiation of sources of different components included in the received audio signal, as described with reference to FIG. 7. The received audio signal may be transmitted to a selected one of any of the external devices 500, 220, 222, and 224 for analysis and/or presentation of a location indicator for the earbud 206, which may be presented as a visual indicator, an audible indicator, or an audiovisual indicator.

It will be appreciated that not all of the external devices 500, 220, 222, and 224 need be used to locate the compact device. Two devices may be selected as a first external device and a second external device to locate and/or triangulate a position of the compact device. When the external devices 500, 220, 222, and 224 operate collectively, two or more of the devices might be used at a time in an attempt to identify a location of the compact device.

It should be noted that the earbud 206 is a compact device that is more likely to have been mislaid in different rooms of a home or other structure than the remote control 202 for the television 500 and, thus, may not be in audio range of the television 500. Whether or not the earbud in a different with the example of a compact device in the form of the remote control 202, when audio signals are generated by different devices in different spaces, the earbud 206 may be found regardless of where the earbud 206 is located. The external devices 500, 220, 222, and 224, as well as the earbud 206 or other compact devices, may operate cooperatively according to a common application, such as the Google Home Application®, which may be able to share data between different devices of different types.

Example Method of Finding a Compact Device

FIG. 10 illustrates an example method 1000 of finding a compact device using at least one audio signal generated by an external device that is detectable by the compact device that transmits a received audio signal to the external device for analysis. At a block 1002, an audio input mechanism on a compact device is enabled to receive audio, as previously described with reference to FIGS. 1 and 2. At a block 1004, an audio signal is generated from an audio output mechanism of an external device, the audio signal being configured to be detectable by the audio input mechanism on the compact device, such as a remote control 202, as described with reference to FIGS. 3A-4C. At a block 1006, a received audio signal is captured at the compact device, such as the remote control 202, as described with reference to FIGS. 4B and 4C. At a block 1008, the received audio signal is sent to the external device, as described with reference to FIGS. 1, 2, and 3A-3C. At a block 1010, the received audio signal is analyzed to determine a position of the compact device relative to the external device, as described with reference to FIG. 3A through FIG. 7. At a block 1012, a location indicator is provided via the external device, the location indicator being representative of the position of the compact device relative to the external device, as previously described with reference to FIGS. 3A-3C and FIG. 8.

This document describes systems and techniques for finding a compact device without the compact device including an audio output mechanism. These systems and techniques may be realized using one or more of the entities or components shown in FIGS. 1, 2, 3A-3C, 5, 8, and 9 and used as described with reference to FIGS. 2, 3A-3C, 4A-4C, 4B, 5, 6A-6B, 7, 8, and 10. Thus, these figures illustrate some of the many possible systems capable of employing the described techniques.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

CONCLUSION

Although implementations of systems and techniques for spatial rediscovery using on-device hardware have been described in language specific to certain features and/or methods, the subject of the appended claims is not necessarily limited to the specific features or methods described. Rather, the specific features and methods are disclosed as example implementations of systems and techniques for spatial rediscovery using on-device hardware.

What is claimed is:

1. A method comprising:

activating an audio input mechanism associated with a compact device;

generating an audio signal by an audio output mechanism associated with an external device;

receiving the audio signal at the audio input mechanism associated with the compact device, the receiving of the audio signal causing the audio input mechanism to produce electrical signals having encoded information associated with the audio signal;

transmitting, based on the electrical signals, wireless signals to the external device;

determining, based on an analysis of the transmitted wireless signals, a spatial positioning of the compact device relative to the external device by comparing a capture time at which the audio signal was received with a transmit time when the audio signal was generated to determine a relative proximity of the compact device to the external device; and providing, based on the determination of the spatial positioning, a location indicator via the external device, the location indicator including information related to the spatial positioning of the compact device relative to the external device.

2. The method of claim 1, wherein:

the capture time is a first capture time;

the audio signal includes a first audio signal having a first characteristic generated by a first audio output mechanism and a second audio signal having a second characteristic generated by a second audio output mechanism; and analyzing the transmitted wireless signals comprises at least one of:

(i) comparing the first capture time and a first received amplitude level of a first component of the first audio signal having the first characteristic with a transmit time and an amplitude level of the first audio signal to determine a relative proximity of the compact device to the external device; or (ii) comparing a second capture time and a second received amplitude level of a second component of the second audio signal having the second characteristic with a transmit time and an amplitude level of the second audio signal to determine a relative proximity of the compact device to the external device.

3. The method of claim 2, further comprising:

calibrating the audio output mechanism and the audio input mechanism to offset an audio output generation delay from the capture time of at least one of the first or second audio signals.

4. The method of claim 2, wherein:

the audio output mechanism includes a first audio output mechanism and a second audio output mechanism associated with the external device; or the first audio output mechanism is associated with a first external device and the second audio output mechanism is associated with a second external device, and the wireless signals are transmitted to and analyzed at the first external device or the second external device.

5. The method of claim 4, wherein the external device includes a portable external device and analyzing the transmitted wireless signals includes successively comparing at least one of the capture time and the received amplitude level of at least one of the first or second audio signals with the transmit time and the amplitude level of the respective audio signal to determine the relative proximity of the compact device to the external device as the external device is moved.

6. The method of claim 1, wherein the location indicator comprises:

at least one of a relative distance to the compact device from the external device or a direction to the compact device from the external device; and at least one of a visual location indicator or an audio location indicator.

7. The method of claim 1, further comprising:

increasing an amplitude level of the audio signal from a first level to a second level, the increase sufficient to enable the compact device to detect the audio signal.

8. The method of claim 1, wherein the compact device comprises at least one of:

a remote control for the external device;

an earbud or other hearable device;

a smartwatch or other wearable device;

a smartphone; or a tablet computer.

9. The method of claim 1, wherein the external device comprises at least one of:

a television or other video display device;

a tablet computer or other portable computer;

a smartphone;

a smartwatch; or a smart speaker.

10. A method comprising:

activating an audio input mechanism associated with a compact device;

generating an audio signal by an audio output mechanism associated with an external device;

receiving the audio signal at the audio input mechanism associated with the compact device, the receiving of the audio signal causing the audio input mechanism to produce electrical signals having encoded information associated with the audio signal;

transmitting, based on the electrical signals, wireless signals to the external device;

determining, based on an analysis of the transmitted wireless signals, a spatial positioning of the compact device relative to the external device by comparing a received amplitude level of the received audio signal with an amplitude level of the generated audio signal to determine a relative proximity of the compact device to the external device; and providing, based on the determination of the spatial positioning, a location indicator via the external device, the location indicator including information related to the spatial positioning of the compact device relative to the external device.

11. The method of claim 10, wherein:

the audio signal includes a first audio signal having a first characteristic generated by a first audio output mechanism and a second audio signal having a second characteristic generated by a second audio output mechanism; and analyzing the transmitted wireless signals comprises at least one of:

(i) comparing a first capture time and a first received amplitude level of a first component of the first audio signal having the first characteristic with a transmit time and an amplitude level of the first audio signal to determine a relative proximity of the compact device to the external device; or (ii) comparing a second capture time and a second received amplitude level of a second component of the second audio signal having the second characteristic with a transmit time and an amplitude level of the second audio signal to determine a relative proximity of the compact device to the external device.

12. The method of claim 11, wherein the location indicator comprises:

at least one of a relative distance to the compact device from the external device or a direction to the compact device from the external device; and at least one of a visual location indicator or an audio location indicator.

13. The method of claim 11, further comprising:

increasing an amplitude level of the audio signal from a first level to a second level, the increase sufficient to enable the compact device to detect the audio signal.

14. The method of claim 11, wherein the compact device comprises at least one of:

a remote control for the external device;

an earbud or other hearable device;

a smartwatch or other wearable device;

a smartphone; or a tablet computer.

15. The method of claim 11, wherein the external device comprises at least one of:

a television or other video display device;

a tablet computer or other portable computer;

a smartphone;

a smartwatch; or a smart speaker.

16. A method comprising:

activating an audio input mechanism associated with a compact device;

generating an audio signal by an audio output mechanism associated with an external device;

receiving the audio signal at the audio input mechanism associated with the compact device, the audio signal includes a first audio signal having a first characteristic generated by a first audio output mechanism and a second audio signal having a second characteristic generated by a second audio output mechanism, the receiving of the audio signal causing the audio input mechanism to produce electrical signals having encoded information associated with the audio signal;

transmitting, based on the electrical signals, wireless signals to the external device;

determining, based on an analysis of the transmitted wireless signals, a spatial positioning of the compact device relative to the external device by at least one of:

(i) comparing a first capture time at which the audio signal was received and a first received amplitude level of a first component of the first audio signal having the first characteristic with a transmit time and an amplitude level of the first audio signal to determine a relative proximity of the compact device to the external device; or (ii) comparing a second capture time at which the audio signal was received and a second received amplitude level of a second component of the second audio signal having the second characteristic with a transmit time and an amplitude level of the second audio signal to determine a relative proximity of the compact device to the external device; and providing, based on the determination of the spatial positioning, a location indicator via the external device, the location indicator including information related to the spatial positioning of the compact device relative to the external device.

17. The method of claim 16, further comprising:

calibrating the audio output mechanism and the audio input mechanism to offset an audio output generation delay from the capture time of the audio signal.

18. The method of claim 16, wherein:

the audio output mechanism includes a first audio output mechanism and a second audio output mechanism associated with the external device; or the first audio output mechanism is associated with a first external device and the second audio output mechanism is associated with a second external device, and the wireless signals are transmitted to and analyzed at the first external device or the second external device.

19. The method of claim 16, wherein the location indicator comprises:

at least one of a relative distance to the compact device from the external device or a direction to the compact device from the external device; and at least one of a visual location indicator or an audio location indicator.

20. The method of claim 16, further comprising:

increasing an amplitude level of the audio signal from a first level to a second level, the increase sufficient to enable the compact device to detect the audio signal.

* * * * *